United States Patent [19]
Bruckner et al.

[11] 3,750,000
[45] July 31, 1973

[54] STEPPING MOTOR EXCITER APPARATUS AND METHOD

[75] Inventors: Ronald L. Bruckner, James E. Helmbold, both of Dayton, Ohio

[73] Assignee: The National Cash Register Company, Dayton, Ohio

[22] Filed: June 19, 1972

[21] Appl. No.: 264,173

[52] U.S. Cl. ............... 318/696, 318/685, 318/138, 318/434
[51] Int. Cl. ......................................... H02k 37/00
[58] Field of Search .................. 318/685, 696, 138, 318/254, 341, 439, 432, 434

[56] References Cited
UNITED STATES PATENTS
3,452,263  6/1969  Newell ........................... 318/696
3,345,547  10/1967  Dunne ............................. 318/696
3,466,520  9/1969  Aylikei et al. ................... 318/696

Primary Examiner—G. R. Simmons
Attorney—J. T. Cavender, Wilbert Hawk, Jr. et al.

[57] ABSTRACT

Disclosed is a salient pole stepping motor combined with high frequency current regulating chopper mode excitation apparatus connected to differentially excite at least two sets of electrical windings of the stepping motor in an excitation method wherein winding current is responsive to instantaneous rotor produced changes in electrical winding inductance.

19 Claims, 6 Drawing Figures

STEPPING MOTOR EXCITER APPARATUS AND METHOD

BACKGROUND OF THE INVENTION

1. Field of the Invention

This invention relates to the field of stepping motor incremental motion devices and electrical energizing techniques for such devices.

2. Description of the Prior Art

Excitation of a stepping motor with a switch modulated or chopped source of direct current energy is described in the paper Drive System for Small or Large Angle PM Stepping Motors by Thomas E. Beling, which was published in the Mar. 17, 1971 issue of the magazine Computer Design at pages 77 to 82. Although such paper by Mr. Beling describes the concept of stepping motor chopper excitation, it does not disclose the concept of differentially exciting several windings of a stepping motor from a chopper source or the improved motor performances resulting therefrom. Mr. Beling's paper also does not disclose the concept of externally controlling the operating frequency of the chopper apparatus nor does it mention the use of chopping regulators or reluctance stepping motor.

U.S. Pat. No. 3,355,646, issued Nov. 28, 1967 on the application of Mr. Tatsuo Goto of Hachioji-shi, Japan discloses the concept of exciting a stepping motor with pulses of energy. In Mr. Goto's patent, the energy pulses are obtained from an alternating current supply and from a bi-level direct current source. Mr. Goto's invention does not differentially excite windings of the stepping motor nor does it employ high frequency chopping apparatus.

The Product Data Sheet number H-770 published by Sigma Instruments Incorporated of Braintree, Massachusetts 02185, United States of America, also describes a chopper excitation system for a stepping motor device. The Sigma chopper system also does not employ differential winding excitation or external control of the chopping frequency.

Bi-phase excitation of a stepping motor wherein the stepping position detents are located generally halfway between stator poles is also known in the prior art. U.S. Pat. No. 2,596,711, issued May 13, 1952 on the application of R. K. Mueller, and U.S. Pat. No. 3,374,410, issued Mar. 19, 1968 on the application of D. H. Cronquist et al., both describe the concept of simultaneously exciting at least two sets of motor stator windings in order that a rotor detent position be created generally halfway between stator poles.

BRIEF SUMMARY OF INVENTION

Excitation of a stepping motor from a chopper modulated source is combined with bi-phase operation of the motor wherein at least two windings are differentially energized and define stepping detents located generally halfway intermediate two successive pole aligned conditions. In the differentially excited windings, the chopper modulated excitation current having an alternating current component is divided inversely according to winding inductance and the motor's instantaneous rotor-stator pole alignment and is dynamically responsive to movement of the motor rotor near a detent position. Dynamic current division between windings during rotor motion near a detent position increases the effective rotor damping and provides rapid quieting of the rotor in an attained detent position.

DETAILED DESCRIPTION OF INVENTION

Effective utilization of a stepping motor is known to require consideration of the electrical circuitry employed to excite the stepping motor windings. It is common practice for instance to employ constant voltage excitation of stepping motor windings when the motor is used in a relatively slow speed environment and the electrical time constant delay inherent in such excitation can be tolerated. It is also common practice to employ constant current excitation of the motor windings in applications demanding increased operating speed from the motor. In many instances, however, the high power dissipation and the poor motor damping characteristics associated with constant current excitation detract from the advantages of increased stepping speed so that some other mode of operation is desirable. Recently the use of a chopper or switching mode current regulator for motor excitation has become popular since the stepping motor driven by such apparatus operates with improved speed, power dissipation and damping when compared with either of the classical exciting techniques. The switching mode current regulator circuit provides a desirable high overall power efficiency and when employed with the bi-phase excitation method, wherein at least two motor windings are excited and a rotor stepping position or detent is thereby located generally midway between two pole aligned conditions, provides unusually good rotor damping characteristics.

Figure 1:
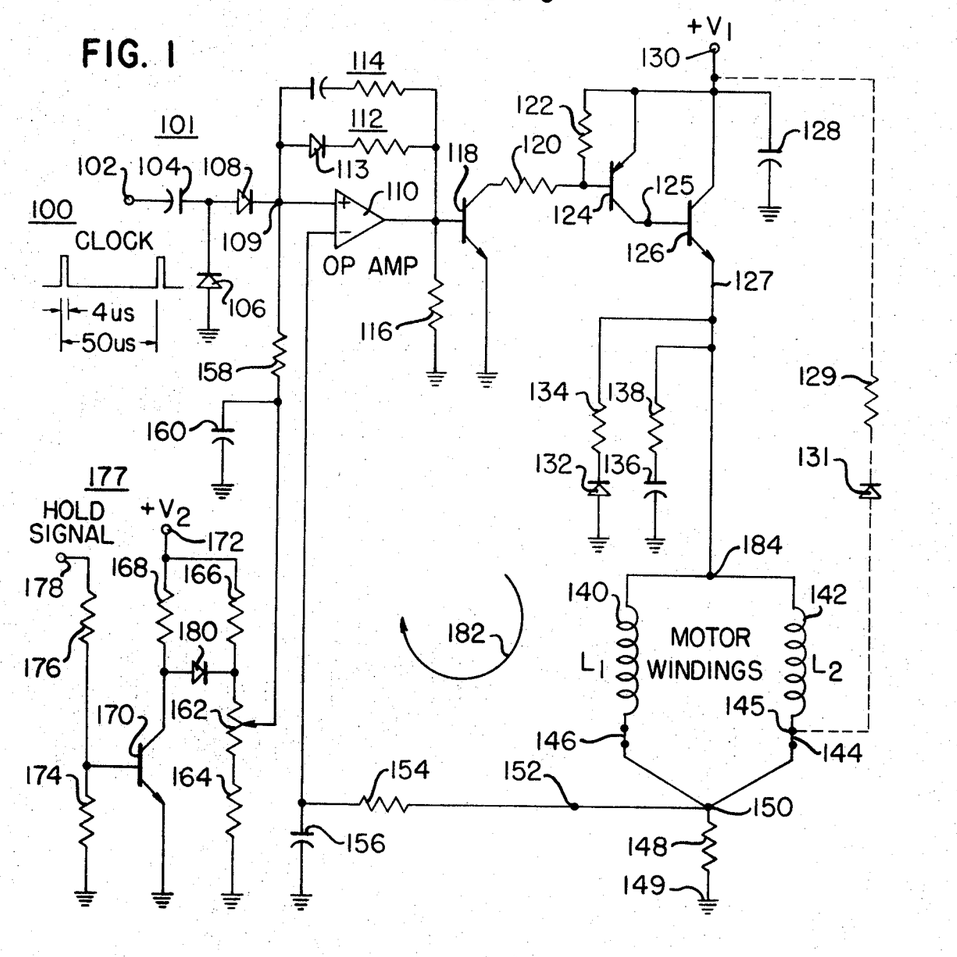
FIG. 1 of the drawings is an electrical schematic diagram of a stepping motor system made according to the present invention.

FIG. 1 of the drawings shows in schematic diagram form a switching mode current regulator which is suitable for stepping motor excitation. The FIG. 1 circuit is suitable for use with either a bi-phase or a conventional single winding method, however, it provides significant performance advantages when used in a bi-phase excitation arrangement.

ELECTRONIC CIRCUIT

The FIG. 1 circuit consists of a switching device such as operational amplifier 110 connected to a group of switching transistors 118, 124 and 126 with the driven motor windings 140 and 142 being connected into the emitter current path of the final switching transistor 126. The operational amplifier 110, the transistors 118, 124, 126 and the motor windings 140 and 142 are all part of a feedback loop identified by the arrow 182. The FIG. 1 circuit also includes the input signal path components at 101 and 177 which lie outside the feedback loop so identified by the arrow 182.

The transistor 126 in FIG. 1 is placed in a conducting state by signals received from terminal 102 through node 109 and the operational amplifier 110. Conduction in the transistor 126 occurs in the saturated mode with the primary path for the conducted current being between the voltage source $V_1$ at terminal 130 through transistor 126, node 184 and the parallel-connected motor windings 140 and 142, through the node 150 and through the current sensing resistance 148 into the ground terminal 149 and thence the source $V_1$. Once conduction in the transistor 126 is initiated, it continues until the signal developed across the current sensing resistance 148 becomes more positive than the voltage at circuit node 109. During a steady state operation of the FIG. 1 circuitry, a clock signal similar to the waveform shown at 100 is applied at terminal 102 and is transmitted through the A.C. coupling network including capacitor 104 and diodes 106 and 108 and through node 109 into the positive terminal of operational amplifier 110. This clock signal initiates the conduction period which is terminated by signals developed across the current sensing resistance 148, the circuitry being in the fully-on stage during a conduction period and in the fully-off stage during the nonconduction period. Regulation of the current flow in motor windings 140 and 142 occurs by way of the signals traveling around the feed-back loop identified by arrow 182. This signal determines the duration of current conduction in transistor 126 once such current conduction is initiated by the clock pulses applied at terminal 102.

The operational amplifier 110 in FIG. 1 is connected to operate in the switching rather than the linear mode of operation, that is, the amplifier is used in the manner of a Schmitt trigger circuit rather than a linear amplifier circuit. In this mode of operation, the amplifier's output signal will correlate with the larger of its positive and negative input signals and will be at either the positive or negative output limit of the amplifier.

The circuit elements at 177 in FIG. 1 provide a selectable level bias signal to the positive input terminal of operational amplifier 110. One level of this selectable level signal causes the FIG. 1 circuit to generate normal motor current while the other provides a reduced magnitude current to the motor windings for use in generating the reduced amount of torque needed in holding (as opposed to moving or accelerating) the rotor of the motor in a stationary position. Reduced holding current provides lower power dissipation and reduced motor heating during long periods of maintaining the motor rotor in a locked stationary condition. The bias circuit shown at 177 in FIG. 1 consists of switching transistor 170 which controls the voltage developed at the slider of potentiometer 162 by way of altering the division ratio of the voltage divider consisting of resistors 166 and 164 and the potentiometer 162. When the switching transistor 170 is in the nonconducting state, current from the resistor 168 flows through diode 180 and provides a higher voltage at the slider of potentiometer 162 than is the condition when transistor 170 is in the conducting state. The signal which determines the conducting and nonconducting times of the transistor 170 is identified as a hold signal and is applied as a positive-going pulse at terminal 178 for transmission through the resistors 176 and 174 to the switching transistor 170. The voltage developed at the slider of potentiometer 162 is derived from a regulated source $V_2$ applied at terminal 172, and is filtered by the capacitor 160 and applied through the resistor 158 to the node 109 and the operational amplifier 110. When the higher level signal from the bias circuit 177 is applied through the resistor 158 to the operational amplifier 110, the current in motor windings 140 and 142 flows for a longer time following each clock turnon and hence produces the normal higher average current flow in the motor windings 140 and 142. The holding current level can be selected as any desired fraction of the normal current — one-third and one-half having been employed in the preferred embodiment by an appropriate selection of values for resistors 162, 164, 166 and 168.

Several of the components shown in FIG. 1 are incorporated in the circuit to provide the environment necessary for functioning of the active components in the circuit, this being true of the resistor 154 and the capacitor 156 which remove high frequency components from the feed-back signal. The diode-resistor network 112 and the capacitor-resistor network 114 provide DC and AC hysteresis characteristics for the operational amplifier 110. The resistors 116, 120 and 122 provide the necessary bias and switching currents for the transistors 118, 124 and 126 in the manner which is known in the art. The capacitor 128 provides filtering and noise suppression for the source $V_1$ at terminal 130.

The diode 132 and the resistor 134 provide the conventional free-wheeling current path for currents generated by the energy stored in motor windings 140 and 142 during the time transistor 126 is in the off condition. In practice, it has been found desirable to use a fast recovery diode having a recovery time near 0.3 microseconds from the 2 ampere conduction state (or a Schottky Barrier diode) in the position of diode 132 in the FIG. 1 circuitry.

As a result of the rapid and large current changes in the conductor 127, the diode 132, and the windings 140 and 142, signals from these parts of the circuit have been found capable of radiating into low level portions of the circuit. Through the use of an RC circuit including capacitor 136 and resistor 138, the fall time of the current in conductor 127 is limited to slower values providing less interference in the low level circuitry.

Figure 3:
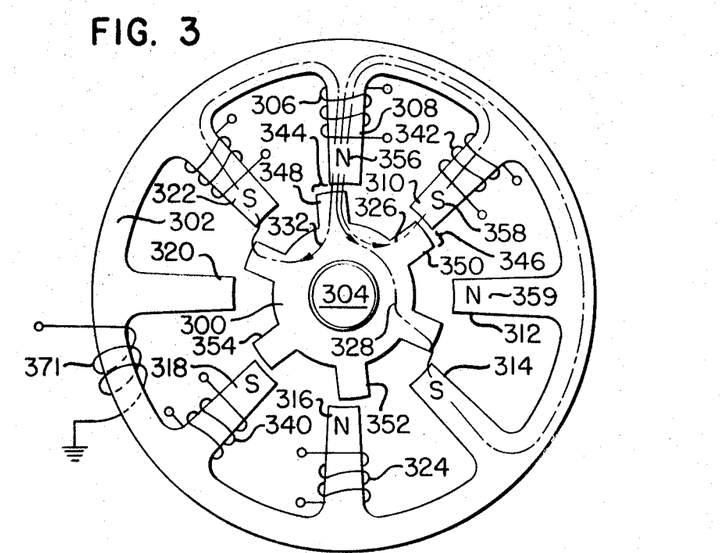
FIG. 3 of the drawings schematically shows the internal parts of a bi-phase excited stepping motor with the rotor and stator members located just past an intermediate detent position.

In practicing the invention, it has been found possible to fabricate all of the FIG. 1 circuitry except the power transistor 126, the motor windings 140 and 142 and the current sensing resistance 148 into a hybrid circuit module containing a mixture of integrated and discrete components and with only the terminals 125, 130, 152, and 178 being brought out of the hybrid package for external connection. Additional high current switching elements may also be inserted into the FIG. 1 circuit in series with each of the motor windings 140 and 142 and in lieu of the jumpers at 144 and 146 in order that the regulated output current from the FIG. 1 apparatus be commutated between windings of the stepping motor.

Where the stepping motor coupled to the FIG. 1 circuit includes two or more windings requiring simultaneous in-phase excitation, as is, for example, the case for the two windings 340 and 342 located at similar positions on diametrically opposite sides of the FIG. 3 motor, the group of similarly phased windings may be connected in series or parallel to form a composite winding as shown at $L_1$, 140 and $L_2$, 142 in FIG. 1.

Many of the switching mode or chopper current regulator circuits known in the prior art operate in the free-running mode wherein both the initiation and the termination of a current pulse are dependent upon electrical time constants found in the motor winding inductance or the power supply. The regulator circuit of FIG. 1 is capable of operating in this free-running or self-timed mode simply by omitting the clock signal from terminal 102. Clock triggering or initiation of the current flow periods in the FIG. 1 circuit has been found to be desirable since it assures stable operation of the regulator circuit in the pulse-width modulating mode. The use of an ultrasonic frequency clock signal such as that shown at 100 in FIG. 1 assures that this stable operating mode produces pulses of current and magnetic flux at a rate above the audio frequency range. These pulses are less likely to produce human audible noise from the stepping motor excited by the FIG. 1 apparatus.

The clock signal shown in FIG. 1 consists of a 4 microsecond pulse which occurs every 50 microseconds. This 4 microsecond pulse initiates a conduction period in the operational amplifier 110 and the transistor 126 every 50 microseconds or at a 20 kilohertz rate. The duration of this conduction period may be short or long depending upon the current regulating action of the feed-back loop designated by arrow 182. Since the circuitry of FIG. 1 may be used with a stepping motor employed in a business machine environment, motor excitation at a frequency which is above the human audible range during all possible regulator conditions has been found desirable in order that objectionable noise from the stepping motor laminations be avoided.

Figure 6:
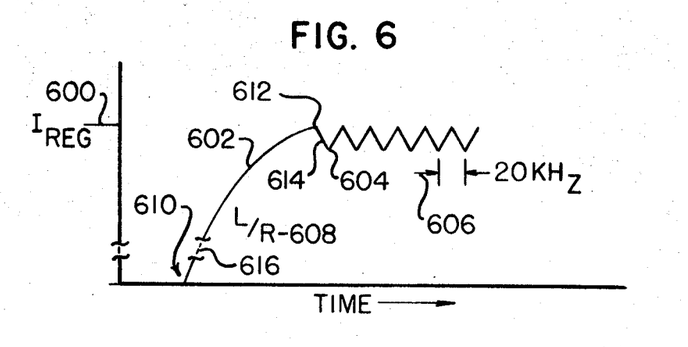
FIG. 6 of the drawings shows a waveform typical of the current flowing in windings of the FIGS. 3 and 4 motor.

In FIG. 6 of the drawings, there is shown an idealized waveform which is descriptive of the chopper regulated current flowing in the current sensing resistance 148 during a typical current build-up and steady state operation of the FIG. 1 circuit.

In the FIG. 6 drawing the transistor 126 begins conduction at the point 610. Following this initiation of conduction, current in the motor windings and the sensing resistance 148 increases according to the curve 602 and at a rate determined by the inductance of the motor windings and the resistance of the motor windings and the other components in the current path. As shown at 608, this portion of the FIG. 6 curve is identified as having characteristics defined by the fraction Inductance/Resistance or L/R. At the point 612 in FIG. 6, the current has reached a magnitude satisfying the signal existing at node 109 of the FIG. 1 circuit and the power transistor 126 is placed in the off state by signal from the operational amplifier 110. Following turn off of the power transistor 126, the winding current decays along the curve 614 until a clock pulse initiates another ON period in the operational amplifier 110.

The diode and resistance network 112 surrounding the operational amplifier 110 allows a DC hysteresis or a separation between the on and off points of the operational amplifier by altering the normal potential at node 109 when the amplifier 110 has an output at the lower of its two output levels. The diode 113 is in the conducting forward biased condition when the amplifier 110 has this lower output voltage. If the diode 113 is open, the network 112 does not conduct and a different switching point exists for the operational amplifier 110 than when the diode 113 is conducting. In a similar manner the RC network 114 provides an AC hysteresis or separation between the ON and OFF points of the operational amplifier 110 by altering the potential at node 109 according to the recent changes in state of the amplifier output terminal. The AC hysteresis characteristic is useful in providing noise immunity for the operational amplifier 110.

Normally the operational amplifier 110 is placed in conduction at the point 604 (FIG. 6) by re-appearance of a clock pulse at terminal 102 in FIG. 1, however, if the clock pulse is omitted and the current in motor windings 140, 142 and the sensing resistance 148 decays to a sufficiently low value that the signal at node 109 including hysteresis is more positive than the signal at the negative input terminal of the operational amplifier 110, the operational amplifier will be turned on even though the clock pulse is absent and transistor 126 will again be placed in the conducting state.

As shown at 606 in FIG. 6, the initiation of current flow in the motor windings 140 and 142 occurs at a 20KHz rate when the system is driven by the clock waveform shown at 100 in FIG. 1. The current curve in FIG. 6 is shown interrupted at the point 616 in order that both the overall current waveshape and the chopping ripple on the current waveform during regulation is viewable. In the preferred embodiment of the invention, the chopping ripple during steady state operation has been found to be near 10 percent of the regulated current amplitude indicated at 600 in FIG. 6.

During the portions of FIG. 6 which are similar to the part indicated at 614, that is, the time when the transistor 126 is in the open state, current flows in the free wheeling network composed of diode 132 and resistor 134 in FIG. 1. Also, as shown in the part of FIG. 6 between the points 610 and 612, the switching regulator of the invention does not commence regulating action until current in the windings builds up to some minimum value, that is, until the inductive delay in the motor windings is overcome.

In a manner similar to the 610–612 portion of the FIG. 6 curve, the regulator circuit may also lose control of the motor current when, for example, in a business machine environment, the motor is operated in the slewing mode wherein rapid rotation past a number of stepping detent positions occurs and large values of EMF are induced in the motor windings. Low winding inductance and high supply voltage at terminal 130 may also be used to reduce the non-regulating time of the FIG. 1 circuitry during motor slewing. Since use of the stepping motor with relatively low winding inductance is already necessary in the invention in order that sufficient exciting current be developed from the 20KHz chopper source, the use of low inductance and high supply voltage to permit regulator action during slewing is not a severe limitation.

STEPPING MOTOR

Figure 2:
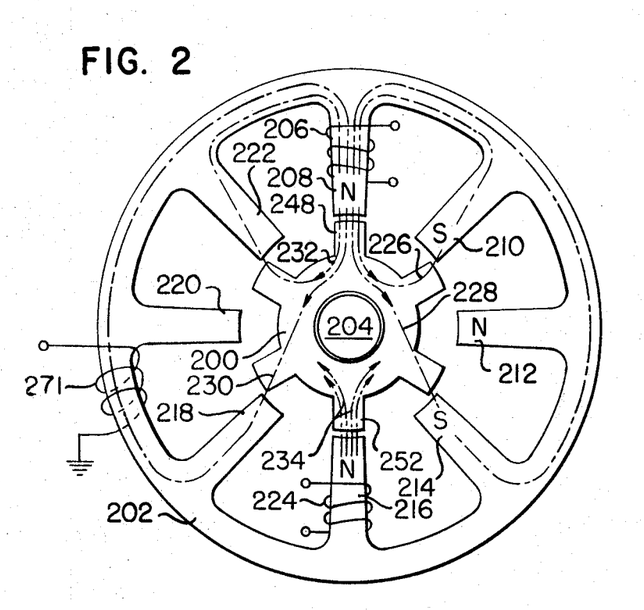
FIG. 2 of the drawings schematically shows the internal parts of a conventionally excited stepping motor with the rotor and stator members located in a pole aligned stepping detent position.
Figure 4:
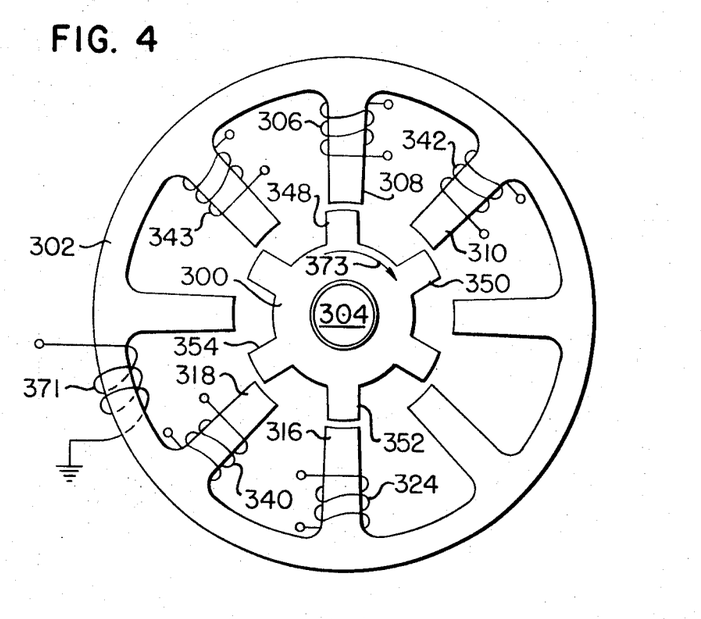
FIG. 4 of the drawings schematically shows the internal parts of the bi-phase excited stepping motor of FIG. 3 with the rotor and stator members located just past an intermediate detent position.
Figure 5:
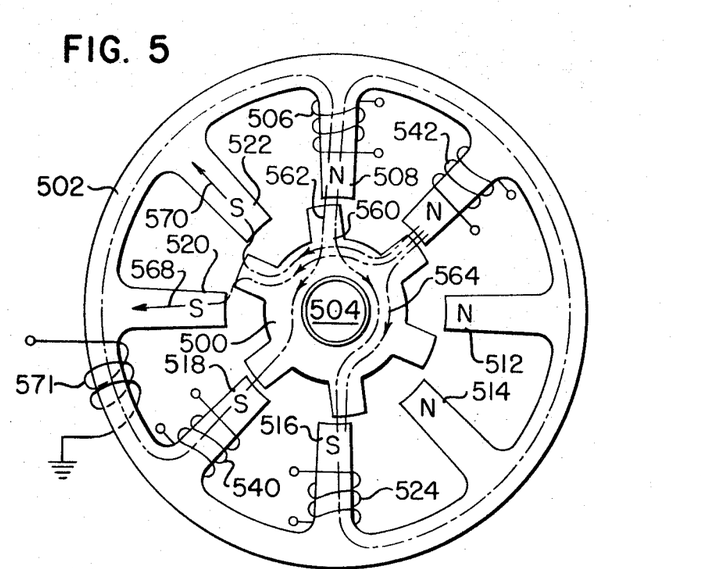
FIG. 5 of the drawings schematically shows the internal parts of a bi-phase excited stepping motor having a modified interconnection of stator windings.

While the FIG. 2 schematic representation of a conventional stepping motor device is useful in explaining operation of the FIG. 1 circuitry, the stepping motor devices of FIGS. 3, 4, and 5 are especially well suited with the circuitry shown in FIG. 1 in practicing the present invention. As shown, the stepping motor devices in FIGS. 2–5 each includes an eight pole stator and a six pole rotor. In FIG. 2 these stator and rotor elements are identified with the numbers 202 and 200, respectively, in FIG. 3 with the numbers 302 and 300, respectively, and in FIG. 5 with the numbers 502 and 500, respectively. Since the motor shown in FIG. 4 is the same motor as that shown in FIG. 3, the component designations used in FIG. 3 are carried into FIG. 4. The six pole rotor is mounted on a shaft 204 in FIG. 2, on a shaft 304 in FIG. 3, and on a shaft 504 in FIG. 5. It is also to be understood that the eight pole stator, six pole rotor stepping motor of FIGS. 2–5 is but one of many pole configurations which may be employed in an embodiment of the present invention, the eight pole stator and six pole rotor having been found convenient for use in certain applications of the present invention.

The stepping motor illustrated in FIG. 2 is shown to be engaged in a conventional detent position wherein rotor pole 248 is magnetically engaged with stator pole 208 and the opposite rotor pole 252 is engaged with stator pole 216, and wherein none of the other rotor or stator poles are fully engaged. The magnetic flux for engaging the rotor and stator poles in the position shown in FIG. 2 can be generated by windings such as winding 206 and winding 224 located respectively on the stator poles 208 and 216. It is also possible to generate this magnetic flux with windings located toroidally around the motor stator as shown at 271 in FIG. 2.

In FIG. 3 of the drawings, the stepping motor is illustrated with the rotor in an intermediate detent position which is located generally halfway between two successive conventional detent positions of the type illustrated in FIG. 2. As illustrated, the rotor 300 is in an intermediate detent position wherein both the adjacent rotor poles 348 and 350 are partially engaged with the respective stator poles 308 and 310. The intermediate detent position engagement of rotor 300 in FIG. 3 is the result of bi-phase excitation of windings 306 and 342 and the similar but oppositely placed windings 324 and 340 on the stepping motor stator 302. In this bi-phase winding excitation, it is assumed that windings located on similar but oppositely placed poles, such as poles 310 and 318, are connected together electrically in a series or parallel arrangement according to convenience. It is important however in the present invention that the windings 306 and 342 be parallel excited in the manner shown for motor windings L1 and L2 in FIG. 1.

In the bi-phase rotor detent position shown in FIG. 3, the tendency of a movable magnetic circuit apparatus to minimize the total air gap encountered by its exciting magnetic flux is determinative of the detent position. This tendency to minimize the air gap, in the eight pole stator and six pole rotor configuration, dictates that the rotor assume the intermediate detent position of FIG. 3, wherein partial and approximately equal engagements occur between rotor pole 348 and stator pole 308 and rotor pole 350 and stator pole 310 with the amount of non-engaged rotor 344 on pole 348 being approximately equal to the amount of non-engaged rotor 346 on pole 350 and with similar conditions prevailing for the opposite rotor poles 354 and 352 at the bottom of FIG. 3.

When the bi-phase excitation method is combined with a switching current regulator or chopper regulator of the type shown in FIG. 1, it is found that the kinetic energy dissipative damping which tends to dissipate rotational movement energy from the rotor exceeds the amount of damping found in a motor excited with constant current.

In FIG. 4 the stepping motor in FIG. 3 is shown with the rotor 300 located in the position it could assume during an overshoot movement. In FIG. 4, the rotor 300 is presumed to have been moving in a clockwise direction with the intended detent or stop position being the position shown in FIG. 3; however, the inertia of rotor 300 and its connected load are presumed to have carried the rotor 300 beyond the intended detent position shown in FIG. 3.

When the rotor 300 is located in the position shown in FIG. 4, it is found that the electrical inductance of winding 306 associated with stator pole 308 exceeds by a significant amount the electrical inductance of winding 342 associated with stator pole 310. The difference in electrical inductance between winding 306 and winding 342 is a result of the relatively good engagement between stator pole 308 and rotor pole 348 and the relatively poor engagement between stator pole 310 and rotor pole 350.

Since the windings 306 and 342 are connected in parallel and excited by the same voltage in the manner shown for windings L1, 140, and L2, 142 in FIG. 1, and since the current produced by the switching regulator circuit of FIG. 1 has an alternating current component, it follows that the different electrical inductance of winding 306 and winding 342 in the FIG. 4 rotor position will result in different current flows in the windings 306 and 342 — the currents being inversely proportional to the instantaneous inductance of the windings 306 and 342. In the FIG. 4 position of rotor 300, the large inductance of winding 306 produces a lesser current flow in this winding than the current flow in winding 342 which has a small inductance and a larger current flow. Since the windings 306 and 342 are excited in a differential manner by a regulating current source, the total current shared by the two windings 306 and 342 is constant and the current flowing in each of the windings 306 and 342 is responsive not only to the inductance of that particular winding but also to the inductance of the other winding. Because of this shared current or differential excitation, the misaligned pole configuration of FIG. 4 produces an especially large difference in currents between the windings 306 and 342; a ratio of 3 to 1 between the winding currents being encountered in ordinary use of the invention.

An important benefit results from the large current flow in winding 342 and the smaller current flow in winding 306. This difference in currents correlates precisely with that which is needed to return the rotor 300 from the overshoot position of FIG. 4 to the desired detent position of FIG. 3. Hence, the combination of a chopper power source and differential excitation of the two windings 306 and 342 in a bi-phase exciting arrangement results in the rotor 300 automatically influencing the motor winding current as it rotates with the influence being such that the altered currents tend to oppose rotor position overshooting. Rotor position responsive stator currents would not be possible in the present invention if the windings were not:

1. excited with current having an A.C. component;
2. excited in a differential manner with a total current of determined magnitude; and 3. in a motor operated in a bi-phase excitation arrangement involving two stator and two rotor poles.

STEPPING MOTOR MAGNETIC FLUX

Several methods for interconnecting windings on the stator poles 308, 310, 312, 314, 316, 318, 320 and 322 in FIG. 3 are known in the art. The path traveled by the motor magnetic flux varies according to the particular method of winding connection selected for these poles. Differential current division between windings in the bi-phase winding excitation arrangement of FIGS. 3–5 is also affected by the method of winding interconnection selected for the motor.

In the conventional detent stepping motor shown in FIG. 2 of the drawings, a major portion of the magnetic flux generated in stator pole 208 flows along the paths 232 and 226 into the rotor and stator poles adjacent the engaged rotor and stator pole pair. Even though a major portion of the flux from stator pole 208 follows such paths 226 and 232, a significant portion of this flux also follows the minor paths 228 and 230 which involve the partially engaged stator poles 214 and 218. The flux pattern illustrated for the stator pole 208 is repeated for the stator pole 216 located at the bottom of FIG. 2 and is partially illustrated by the arrows 234 which are shown diverging in the rotor 200.

The flux pattern described above for the relatively simple FIG. 2 case of rotor and stator poles directly engaged on a one-to-one basis is modified considerably for the bi-phase excitation arrangement shown in FIG. 3 of the drawings. In FIG. 3, where both the windings 306 and 342 are excited, part of the magnetic flux from stator pole 308 travels in the adjacent stator pole 310 while another part follows the path 332 through the slightly engaged stator pole 322. Still an additional part flows according to the path 328 through the partially engaged stator pole 314 and a smaller amount travels through each of the rotor and stator poles of the motor. It is significant in FIG. 3 that all of the flux originating in stator pole 308 is not required to return through stator pole 310 but that sizable portions of this flux can travel across the structure of rotor 300 and return to the stator through other rotor and stator pole pairs. If it were necessary that all of the flux originating in stator pole 308 return from the rotor 300 via stator pole 310, it would be impossible for the windings 306 and 342 to have significantly different values of electrical inductance since the same flux would flow in both poles 308 and 310 and would engage both windings 306 and 342. The significantly different values of electrical inductance are needed to obtain the desired differential division of winding currents as described for windings 306 and 342.

The flux paths illustrated in FIG. 3 are established in the eight pole stator, six pole rotor motor under the condition of alternating magnetic polarity in the stator poles as shown at 356, 358 and 359, etc. The alternating polarities shown in FIG. 3 comprise but one of the magnetic pole configurations possible for the eight pole stator, six pole rotor stepping motor. In FIG. 5 is shown a different configuration of stator magnetic polarities for the eight pole stator, six pole rotor motor, where all of the stator poles in each half of the motor are of the same magnetic polarity — that is, are of the same magnetic polarity for each semicircular half of the stator member 502 (FIG. 5). The magnetic pole configuration shown in FIG. 5 has also been found to be usable under the conditions of bi-phase winding excitation with a switching mode current regulator as disclosed in this specification. Part of the magnetic flux paths resulting from the magnetic pole configuration shown in FIG. 5 are illustrated by the paths at 560, 564, 568, and 562. An exact description of the magnetic flux flow in the flux paths of the FIG. 5 motor (as well as the FIG. 3 motor) has been found to be very complex and definable only with the aid of differential equations and computer aided solution of these equations.

One important difference is found between motors excited according to the FIG. 5 pole arrangement as compared with the FIG. 3 pole arrangement, in that during all except one of the stepping movements of the rotor 500 in FIG. 5, motor magnetic flux travels from one stator pole across the rotor structure into one or more other stator poles. During this one stepping movement of the rotor 500, however, flux does not flow across the rotor like is done in the FIG. 3 motor but instead flows between two adjacent stator poles 514 and 516 which have opposite magnetic polarity. It is found in practice that a significant difference in rotor torque and also a significant difference in the rotor damping characteristics are observed between the adjacent pole and the across-the-rotor flux paths for the FIG. 5 motor.

To move the rotor 300 in FIG. 4 into the stepping detent position shown, it was necessary that windings 342 and 306 be energized. To move the rotor 300 into the next upcoming stepping detent position in the clockwise direction indicated by the arrow 373, it is necessary that the winding 343 and the winding 306 be concurrently energized. For the eight pole stator, six pole rotor motor shown in FIGS. 2–5, a pole energization sequence which moves opposite the direction of rotor rotation is required.

The commutation from current flowing in winding 342 to current flowing in winding 343 in FIG. 4 is accomplished by switching transistors located at the position of jumpers 144 and 146 in FIG. 1. In a practical embodiment of the FIG. 1 system using one of the motors shown in FIGS. 2–5, there are actually four winding sets rather than simply the two windings 140 and 142 connected to the circuit node 184, one of which four sets is for each of the four diametrically opposed pairs of stator poles. Since the two windings 140 and 142 are descriptive of the inventive concept of the FIG. 1 system, the practical embodiment of the four windings are thus omitted. Similarly omitted from the FIG. 1 system is the free wheeling diode network which provides a path for the stored energy current from windings 140 and 142 when commutating switches at jumper positions 144 and 146 are opened. These free wheeling diode networks are connected as shown by the dotted lines associated with diode 131 and resistor 129 in FIG. 1.

During commutation from current flowing in winding 342 to current flowing in winding 343 in FIG. 4, the current from winding 342 is abruptly removed from the sensing resistance element (148 in FIG. 1) by the opening of a transistor switch located at the jumper positions 144 and 146 in FIG. 1. Since the current in winding 343 requires some finite time to build up to the abruptly interrupted level of winding 342, there exists a period during commutation wherein the constant current regulating action of the FIG. 1 apparatus causes current in the non-commutated winding 306 to be increased in magnitude. This increased current magnitude in such winding 306 is beneficial to stepping motor performance since it provides increased magnetic flux and increased pole strength in stator pole 308 and thereby increases the force attracting rotor 300 to the next stepping detent position.

Depending upon the supply voltage and the electrical time constants of the commutated windings 342 and 343 in FIG. 4, it is of course possible for the chopping regulator apparatus of FIG. 1 to cease regulating and become saturated during commutation since the abrupt interruption of current in the turned-off winding 342 occurs more rapidly than current can increase in the newly turned on winding 343 or the non-commutated winding 306.

The current flowing from the switching chopping regulator to the stepping motor windings is described herein as having an alternating current component or being undulating in nature. In so describing the winding current, it is recognized that the current resulting from opening and closing switching transistor 126 in FIG. 1 would, in the case of a resistive load, appear as a series of unidirectional or DC current pulses and that the inductance of windings 140 and 142 tends to smooth these pulses of current into a constant flow. Despite this smoothing, "current having an alternating current component" aptly describes the regulated current waveform since at least some pulsing or undulations of current remain after the smoothing and since a Fourier series analysis of the winding current would show it to include at least a DC component and one AC component.

The tendency of chopper derived differential currents flowing in windings 306 and 342 (FIGS. 3 and 4) to urge an overshooting or an oscillating motor rotor into its intended stepping detent position is especially significant when the performance of a motor excited with the FIG. 1 system is compared with that of a motor having a constant current flowing in each excited winding. If the rotor of the constant current excited motor overshoots an intended detent position (of the bi-phase type shown in FIG. 4), the rotor-stator pole pair having the best alignment condition (poles 308 and 348 in FIG. 4) will tend to attract the rotor to the overshoot position or hold it in this position once attained. Since this best aligned pole pair is energized with full exciting current in the constant current case and the aligned poles provide a good flux path, this attracting or holding in the overshoot position is especially strong. Moreover once the rotor attains the overshoot position the rotor-stator pole pair which should be most effective in returning the rotor to the intended detent position (poles 310 and 350 in FIG. 4) will be handicapped by poor engagement and the resulting smaller magnetic flux and magnetic force even though such pair is excited by full winding current.

In the laboratory a motor excited with constant current in each of the bi-phase excited windings has been observed to oscillate around the intended detent position for a prolonged period as a result of this strong force in the overshoot aligned poles and weak force in the overshoot correcting poles. When the same motor is energized with the FIG. 1 system in lieu of a constant current apparatus, a significant difference occurs in both the overshoot aligned pole pair and the pole pair which should be most effective in returning the rotor to the intended detent position. With the FIG. 1 system the overshoot aligned pole pair (308 and 348 in FIG. 4) is no longer excited by full current and hence strongly influential on rotor performance but is instead excited by a current diminished by the large inductance resulting from the relatively good alignment between these poles. In addition to causing the overshoot poles to be excited by diminished current, the FIG. 1 system will also cause the pole pair which should be most effective in returning the rotor to the detent position (poles 310 and 350 in FIG. 4) to be excited by a greater than normal current and hence to be more effective than normal in correcting the overshoot condition. Once the rotor attains the intended detent position after the overshoot is corrected, current in the two bi-phase windings 140 and 142 of the FIG. 1 system will of course equalize because of the equal inductance in the windings.

In addition to the magnetic flux magnitudes which are responsive to positioning of the stepping motor rotor, the present invention is also believed to provide increased kinetic energy dissipating ability or damping over the stepping motor apparatus of the prior art. This energy dissipating capability or damping is believed to involve the large changes of rotor and stator magnetic flux which occur as the rotor moves about the intended detent position. These large magnetic flux changes are believed to dissipate kinetic energy through the mechanisms of magnetic hysteresis and eddy currents in the motor structure in the manner known in the art and possibly to involve dissipation in some of the electrical components conducting current during the oscillating period.

In the present invention, a particular form of stepping motor exciting current together with a particular arrangement of motor windings allows the motor winding current to be automatically responsive to the position of the stepping motor rotor and causes the motor rotor to be positively retained in a stepping detent position. Operation of the invention has been described in terms of winding inductance flux flow in the stepping motor. It is also known that voltages are induced in the stepping motor windings as the alignment of rotor and stator poles is changed. The effect of these induced voltages on the currents in the motor windings has been described herein only in connection with a "slewing mode of operation" of the motor since changes in winding inductance and magnetic flux are believed most significant in such type operation of the apparatus.

While the system and apparatus hereof accomplishes the objects and advantages mentioned, certain variations may occur to those skilled in the art and it is contemplated that all such variations not departing from the spirit and scope of the invention hereof are to be construed in accordance with the following claims.

What is claimed is:

1. Electrical transducer apparatus comprising:
    an electrical stepping motor of the type having a rotor member which is magnetically positionable in a plurality of detent positions each located generally intermediate two adjacent pole aligned detent positions by simultaneous excitation of two electrical windings, each winding being associated with one pole of said adjacent pole-aligned detent positions;
    modulated electrical exciting means connected differentially with said two electrical windings for supplying to said windings differentially divided exciting currents having at least an undulating variation imposed thereon; and commutating means connected with each electrical winding of said stepping motor and with said electrical exciting means for diverting said differentially divided exciting current to subsequent pairs of electrical windings;

whereby the electrical inductance of each winding of said two differentially connected windings is dependent upon the degree of alignment between rotor and stator poles instantaneously associated with said winding and current division between said differentially connected windings is responsive to said electrical inductance and to said degree of alignment for producing high current flow in a winding associated with a poorly aligned rotor-stator pole pair and low current flow in a winding associated with a well aligned rotor-stator pole pair.

2. Electrical transducer apparatus as in claim 1 wherein said stepping motor has a greater number of stator poles than rotor poles.

3. Electrical transducer apparatus as in claim 1 wherein said stepping motor has eight stator poles and six rotor poles.

4. Electrical transducer apparatus as in claim 1 wherein said electrical windings and said commutating means are connected to generate magnetic poles of alternating magnetic polarity around the periphery of said stator member.

5. Electrical transducer apparatus as in claim 1 wherein said electrical windings are polarized to generate in one semicircular half of said stator member magnetic poles of one polarity and in the remaining semicircular half of said stator member magnetic poles of the opposite polarity.

6. Electrical transducer apparatus as in claim 1 wherein said stepping motor includes a rotor member having material composition and cross sectional shape capable of transmitting significant quantities of magnetic flux from rotor poles located on one side thereof to rotor poles located on the other side thereof and wherein said electrical windings are connected to direct a significant portion of the magnetic flux generated thereby across at least part of said rotor member during at least part of the operating cycle of said apparatus.

7. Transducer apparatus for converting electrical energy into precise increments of rotational mechanical energy, said apparatus comprising:

an electrical stepping motor member having a multiple poled stator portion and a multiple poled rotor portion, the rotor portion being magnetically rotatable into a plurality of rotor-stator pole aligned first detent positions by excitation of electrical windings associated with a singular rotor step position and magnetically rotatable into a plurality of rotor-stator pole misaligned second detent positions located generally intermediate said first detent positions by concurrent excitation of electrical windings associated with at least two of said first detent step positions;

electrical exciter means selectively connected with concurrently excitable electrical windings of said stepping motor non-alignable rotor-stator pole pairs and including a source of electrical energy and a chopper modulated current regulator responsive to the total current flow in both windings of said concurrently excitable non-alignable rotor-stator pole pairs, for supplying to said stepping motor bursts of chopped electrical energy capable of moving said rotor member into successive rotational positions;

whereby a dynamic rotor position responsive division of said chopper modulated total current flow occurs between said concurrently excited windings wherein the larger inductance of a closely aligned rotor-stator pole pair produces a smaller winding current flow therein and the smaller inductance of a non-aligned rotor-stator pole pair produces a larger winding current flow therein; and whereby the tendency of said stepping motor rotor member to pass by one of said rotor-stator pole misaligned second detent positions in an overshoot motion is opposed by a decrease of current and magnetic flux in the stator pole ahead of said second detent position and an increase of current and magnetic flux in the stator pole behind said second detent position as said rotor member rotates through said second detent position.

8. Transducer apparatus as in claim 7 wherein said chopper modulated current regulator in said electrical exciter means includes a current sensing element, an amplifier element and a current switching element connected into a feed-back loop configuration wherein signals from said current sensing element pass through said amplifier element and control the current conducting time in said current switching element and wherein said current switching element is connected between said source of electrical energy and said concurrently excitable electrical windings for controlling current flow therebetween.

9. Transducer apparatus as in claim 7 wherein said chopper modulated current regulator includes clock means for periodically initiating pulses of current in said stepping motor windings at a rate independent of the electrical time constant of said windings.

10. Transducer apparatus as in claim 9 wherein said clock means includes electrical timing means for initiating pulses of current at a frequency above the audio frequency range;

whereby sound energy emitted by said stepping motor is composed primarily of frequencies above the human audible range.

11. Apparatus for differentially exciting two electrical windings of a multiple-poled stepping motor, said apparatus comprising:

a source of direct current electrical energy;

a current sensing element capable of developing a current signal representative of the instantaneous current flow therein;

an electrical switching element;

said source of direct current electrical energy, said electrical switching element, said current sensing element and a parallel combination of said two electrical windings being connected together in an exciting current series electrical circuit; and pulsed electrical driver means having an input node connected with said current sensing element and an output port connected with said electrical switching element in closed feedback loop fashion for driving said electrical switching element in a pulsed current modulating mode wherein the ratio of conducting and non-conducting time is responsive to said current signal and thereby to the average current flowing in said exciting current series electrical circuit;

whereby current regulating action of said closed feedback loop maintains a constant total current flow in said two electrical windings and said constant total current flow can be instantaneously divided between said two electrical windings according to the degree of engagement between stepping motor rotor and stator poles associated with said winding circuits.

12. Apparatus for differentially exciting as in claim 11 wherein said pulsed electrical driver means includes an input node and a source of bias signals connected thereto for altering the ratio of conducting and non-conducting times in said electrical switching element;

whereby bias signals for altering the magnitude of current flowing in said exciting current series electrical circuit may be applied to said apparatus.

13. Apparatus for differentially exciting as in claim 11 wherein said pulsed electrical driver means includes clock timing means for periodically initiating conductivity in said electrical switching element;

whereby the pulsing rate of said pulsed electrical driver means may be positively established at a predetermined frequency.

14. Apparatus for differentially exciting as in claim 11 wherein said pulsed electrical driver means includes operational amplifier circuit means connected as a saturating amplifier pulse width modulator for determining time duration of the current modulating pulses in said electrical switching element.

15. A method for exciting the electrical windings of a salient pole stepping motor of the type having stator windings associated with each stator pole for reducing rotational overshoot of the motor rotor at an attained stepping position, said method comprising the steps of:

placing the rotor of said stepping motor in motion by altering the pattern of excitation of said stator pole windings;

energizing the stator poles immediately preceding and immediately following the next intended rest stepping position of said rotor with a preceding pole and a following pole exciting current, said next intended rest stepping position being located generally midway between said immediately preceding and said immediately following stator poles;

increasing the magnitude of said preceding pole exciting current after said rotor has rotated through a position of maximum alignment with said preceding pole;

decreasing the magnitude of said following pole exciting current after said rotor has rotated through a position of maximum alignment with said preceding pole.

16. A method for exciting as in claim 15 including the step of:

augmenting the magnitude of said following pole exciting current after said rotor has rotated through a position of maximum alignment with said following pole in an over-shoot motion;

whereby said rotor is urged backward toward said following pole.

17. A method for exciting as in claim 15 including the step of:

diminishing the magnitude of said following pole exciting current as said rotor member re-approaches a position of maximum alignment with said following pole during relaxation from an overshoot motion.

18. A method for exciting as in claim 15 wherein said exciting current is a direct current having superimposed thereon a pulse modulated regulation component and wherein said preceding pole and following pole currents are derived from said pulse modulated direct current; whereby said preceding pole exciting current and said following pole exciting current are instantaneously responsive to the electrical inductance and the magnetic reluctance properties of both said preceding pole and said following pole as the alignment of said preceding and following poles with poles of said rotor member changes during rotor movement.

19. A method for exciting as in claim 18 wherein said preceding pole and said following pole exciting currents are currents derived differentially from said pulse modulated direct current;

whereby the magnitude of said following pole exciting current is responsive to electrical inductance and magnetic reluctance property changes in both said preceding pole and said following pole; and whereby the magnitude of said preceding pole exciting current is responsive to electrical inductance and magnetic reluctance property changes in both said preceding pole and said following pole.

* * * * *